C. M. HURD.
FRUIT GATHERING DEVICE.
APPLICATION FILED JUNE 1, 1920.
1,366,001.
Patented Jan. 18, 1921.
2 SHEETS—SHEET 1.
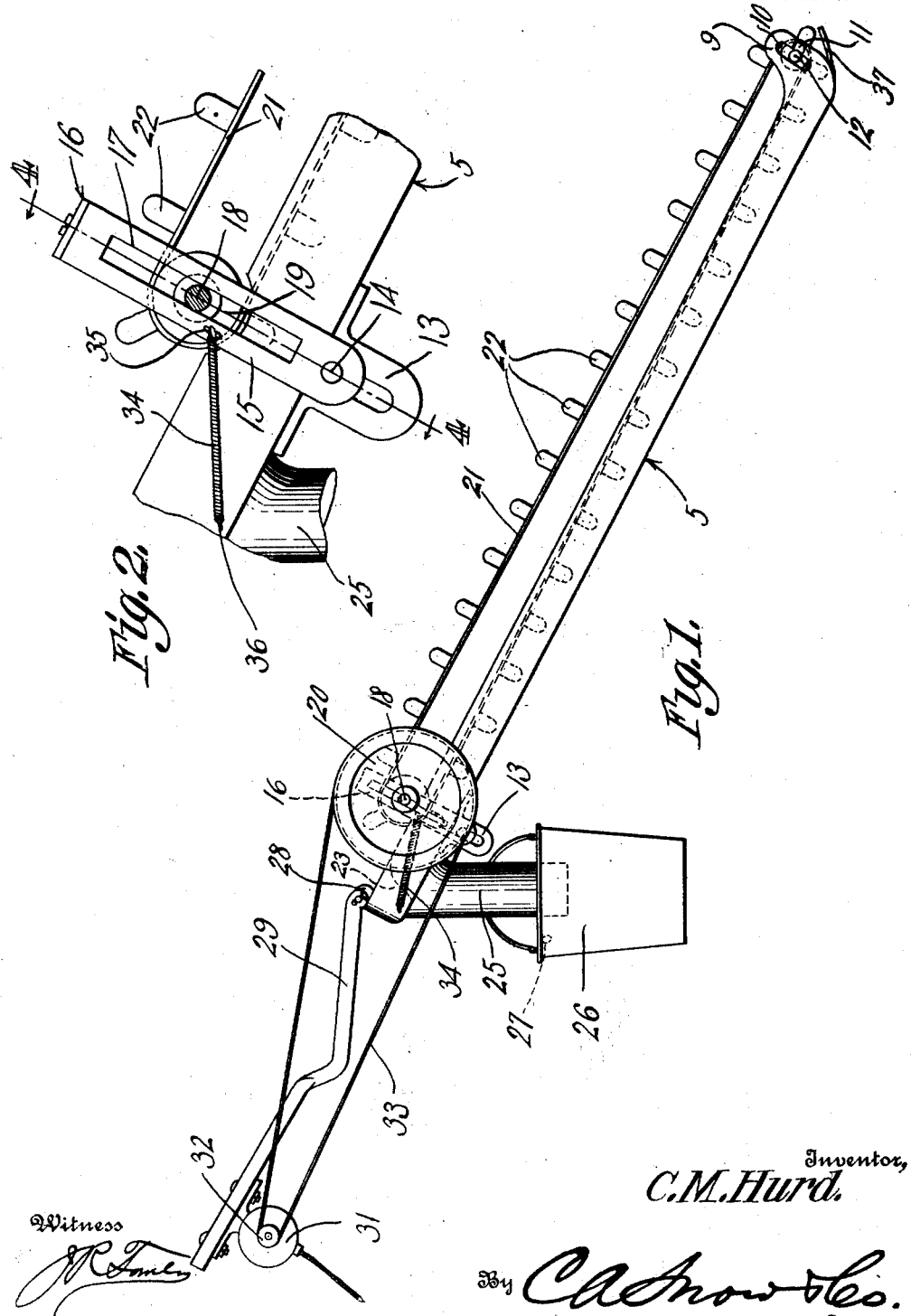
Inventor,
C.M.Hurd.
By C.A.Snow & Co.
Attorneys
Witness

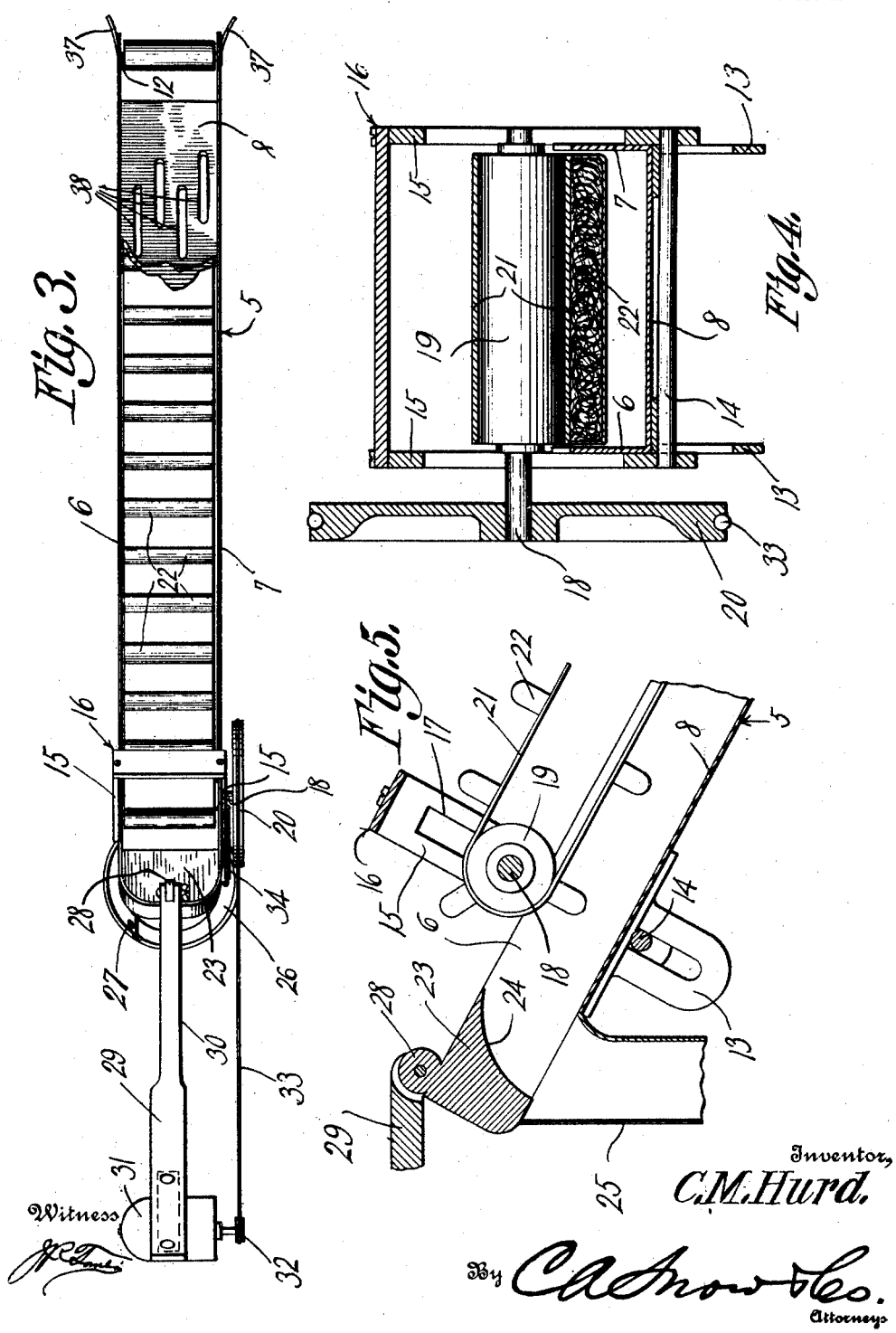

UNITED STATES PATENT OFFICE.

CHAUNCEY M. HURD, OF SAN JOSE, CALIFORNIA.

FRUIT-GATHERING DEVICE.

1,366,001.  Specification of Letters Patent.  Patented Jan. 18, 1921.

Application filed June 1, 1920. Serial No. 385,702.

*To all whom it may concern:*

Be it known that I, CHAUNCEY M. HURD, a citizen of the United States, residing at San Jose, in the county of Santa Clara and State of California, have invented a new and useful Fruit-Gathering Device, of which the following is a specification.

This invention relates to fruit and nut gathering devices, and more particularly to devices of this character adapted to gather nuts and fruit from the ground surface, to which the same have fallen.

The primary object of the invention is to provide a device of this character which may be operated to gather fruit or nuts, by an operator assuming a standing position, thereby facilitating the gathering operation and reducing the manual labor involved in gathering fruit or nuts to a minimum.

A further object of the invention is to provide a power operated means for gathering fruit or nuts, thereby increasing the speed of the gathering operation, and consequently reducing the cost of gathering fruit or nuts.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a gathering device constructed in accordance with the present invention;

Fig. 2 illustrates a fragmental detail view of one end of the device;

Fig. 3 illustrates a plan view of the same;

Fig. 4 illustrates a sectional view taken on line 4—4 of Fig. 2;

Fig. 5 illustrates a fragmental sectional view of one end of the device.

Referring to the drawings in detail, the body portion of the device includes a trough indicated generally by the reference character 5, which is formed preferably of sheet metal, and includes the side walls 6 and 7, and bottom wall 8.

Formed at the forward extremity of the side members 6 and 7 are the bearing members 9, each of which is provided with an elongated opening 10 slotted as at 11 to permit the roller shaft 12 to be positioned in the opening 10.

Disposed at the upper end of the trough 5 and secured to the bottom wall 8 thereof, are the bearing members 13 disposed adjacent opposite edges of the trough in a manner to support the arm 14, which has its ends extending through the bearing members and connected to the side members 15 of the frame 16, which is shown as having opposed elongated openings 17 to provide bearings for the shaft 18 of the roller 19, operating at the upper end of the trough.

One extremity of the shaft 18 extends beyond the plane of the side member 15 and receives the power pulley 20, which is keyed or otherwise secured to the shaft to move therewith, the pulley being provided for the purpose of transmitting rotary motion to the roller 19 to cause the operation of the endless conveyer 21, to be hereinafter more fully described.

This endless conveyer comprises a belt which is of a width slightly less than the distance between the side walls 6 and 7 of the trough, to permit a portion of the belt to move within the trough, to accomplish the feeding operation, and as shown, this belt is provided with a plurality of ribs 22 formed preferably of sheepskin, or felt, but it is to be understood that any suitable soft or flexible material may be employed in the construction of these ribs 22; the material of which the ribs are formed, should however be such as would not bruise or injure the fruit or nuts under operation.

The upper end of the trough is closed by the end member 23 that has a curved surface 24 adapted to cam or direct the articles being gathered, downwardly into the mouth of the flexible discharge tube 25, which has its lower end disposed within a suitable bucket indicated at 26, which bucket is preferably provided with an opening 27 adapted to receive a suitable hook not shown, which hook may be carried by a suitable supporting means carried by the operator.

An apertured ear 28 is formed on the end member 23, and accommodates the bifurcated end of the operating arm 29, which is cut away as at 30 to provide a convenient handle for the operator to grasp in the carrying out of the operation of the device. A suitable motor indicated at 31 and which receives the electric energy from any suitable source, is supported on the free end of the operating arm 29, which motor carries a pulley 32 that has communication with the power pulley 20 through the belt 33, operating over the pulleys.

Due to the manner in which the frame 16 is supported, it is obvious that the same will rock with relation to the body portion or trough of the device, and in order to restrict such rocking movement, a coiled spring indicated at 34 is provided, which has one of its ends connected to the frame 16, as at 35, the opposite end thereof being anchored to the trough as at 36, so that the tension of the spring will normally support the frame 16 at right angles to the body portion 5.

It might be further stated that due to the manner in which the roller 19 is supported, the roller may move vertically within its bearings so that the roller will automatically adjust itself to permit articles of various sizes to pass under the roller, on its passage to the discharge tube 25.

Disposed adjacent to the forward extremity of the body portion 5 are the guiding fingers 37 which guide the fruit or articles being gathered, to the forward end of the trough, where the same are engaged by the ribs 22.

Elongated openings 38 are formed in the bottom wall 8 of the trough, which openings are of widths to permit small pieces of dirt or stones to pass through the trough, thus eliminating any possibility of small stones or dirt being fed into the bucket 26.

In the operation of the device, the operator grasps the operating arm 29, by the handle portion 30, and starts the endless conveyer 21 moving through the trough. The forward portion of the trough is now moved into engagement with the nuts or fruit to be gathered, whereupon the endless conveyer 21 causes the articles to be fed upwardly, through the trough.

Having thus described the invention, what I claim as new is:—

1. A fruit gathering device including a body portion, said body portion comprising a trough, bearing members supported on the trough and adjacent the upper end thereof, a frame having elongated openings formed therein, said openings providing bearings, a shaft supported within the bearings and adapted to move longitudinally thereof, a roller disposed at each end of the trough, an endless conveyer operating over the rollers for moving material through the trough, means for receiving material from the trough, and means for normally urging the bearings toward the upper end of the trough.

2. A fruit gathering device including a body portion comprising a trough, a bearing roller disposed at each end of the trough, an endless conveyer operating over the rollers, flexible rib members disposed on the conveyer, means at the upper end of the trough for receiving material from the trough, means at the lower end of the trough, for guiding material to the trough, and means for supporting said bearing rollers to permit the bearing rollers to move vertically with relation to the trough.

In testimony that I claim the foregoing as my own, I have hereto affixed my signature in the presence of two witnesses.

CHAUNCEY M. HURD

Witnesses:
 RUTH ARMOND,
 RICHARD V. BRESSAM.